(12) United States Patent
Sivavarman et al.

(10) Patent No.: US 11,688,866 B2
(45) Date of Patent: Jun. 27, 2023

(54) CATHODE SUBSYSTEM COOLING AND HUMIDIFICATION FOR A FUEL CELL SYSTEM

(71) Applicant: Robert Bosch GmbH, Stuttgart (DE)

(72) Inventors: Suresh Sivavarman, LaSalle (CA); Jordan Thomas Kreda, Gregory, MI (US); Ganesh Vedula, Northville, MI (US); Amit Dhingra, Canton, MI (US); Tyler Boggs, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/396,424

(22) Filed: Aug. 6, 2021

(65) Prior Publication Data
US 2023/0043265 A1 Feb. 9, 2023

(51) Int. Cl.
*H01M 8/0444* (2016.01)
*H01M 8/04119* (2016.01)
*H01M 8/248* (2016.01)

(52) U.S. Cl.
CPC ... *H01M 8/04455* (2013.01); *H01M 8/04126* (2013.01); *H01M 8/248* (2013.01); *H01M 2250/20* (2013.01)

(58) Field of Classification Search
CPC .......... H01M 8/04335; H01M 8/0435; H01M 8/04835; H01M 8/04126; H01M 8/04455
See application file for complete search history.

(56) References Cited

U.S. PATENT DOCUMENTS

| | | | |
|---|---|---|---|
| 7,798,269 B2 | 9/2010 | Makuta et al. | |
| 8,663,854 B2 | 3/2014 | Wahl et al. | |
| 8,920,987 B2 | 12/2014 | Lee et al. | |
| 9,614,238 B2 * | 4/2017 | Handgraetinger | ......................... H01M 8/04111 |
| 9,774,046 B2 | 9/2017 | Sanderson et al. | |
| 9,859,578 B2 | 1/2018 | Kemmer et al. | |
| 10,505,208 B2 | 12/2019 | Adcock et al. | |
| 2011/0045367 A1 | 2/2011 | Heidrich | |

FOREIGN PATENT DOCUMENTS

| | | | |
|---|---|---|---|
| CN | 112201806 | * | 1/2021 |
| CN | 110649284 B | | 2/2021 |
| CN | 113851670 A | | 12/2021 |

(Continued)

OTHER PUBLICATIONS

English translation of CN Publication 112201806, Jan. 2021.*
(Continued)

*Primary Examiner* — Brittany L Raymond
(74) *Attorney, Agent, or Firm* — Michael Best & Friedrich LLP

(57) ABSTRACT

A system and method for cooling and humidifying a cathode subsystem of a fuel cell for an automobile. The system includes a compressor, an air input line including an intercooler configured to cool air output by the compressor, a fluid output line including a fluid injection system, a cathode stack configured to receive air via the air input line and output a fluid to the fluid output line, and an electronic processor. The electronic processor is configured to control the fluid injection system such that the fluid output from the cathode stack is injected into the air input line.

10 Claims, 4 Drawing Sheets

(56) References Cited

FOREIGN PATENT DOCUMENTS

EP          2538482  A2     12/2012

OTHER PUBLICATIONS

Fly et al., "A comparison of evaporative and liquid cooling methods for fuel cell vehicles", International Journal of Hydrogen Energy, vol. 41, 2016, pp. 14217-14229.
Bargal et al., "Liquid cooling techniques in proton exchange membrane fuel cell stacks: A detailed survey", Alexandria Engineering Journal, vol. 59, 2020, pp. 635-655.
Diepenhorst et al., "Fuel Cell Air Intake System: Final Report", University of Michigan Engineering, 2009, 146 pages.
Toyota, "2018 Mirai", Informational Booklet, 2018, 22 pages.
Ricardo, "Heavy Duty Truck Cooling Challenges", Presentation, Prepared by Colin Kimber and Dr. Cedric Rouaud, Presented by Chris Brockbank, 2019, 19 pages.
International Search Report for Application No. PCT/EP2022/071121 dated Nov. 30, 2022 (4 pages).

* cited by examiner

CATHODE SUBSYSTEM COOLING AND HUMIDIFICATION FOR A FUEL CELL SYSTEM

FIELD

Embodiments presented herein relate to fuel cell systems.

BACKGROUND

A fuel cell system is an electricity generation system that electrochemically converts chemical energy into electrical energy in a fuel cell stack. Fuel cell systems may supply electric power for various kinds of devices, for example, portable devices, industrial and household appliances. Fuel cell systems may also be utilized in vehicle systems including, but not limited to, on-road passenger vehicles.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
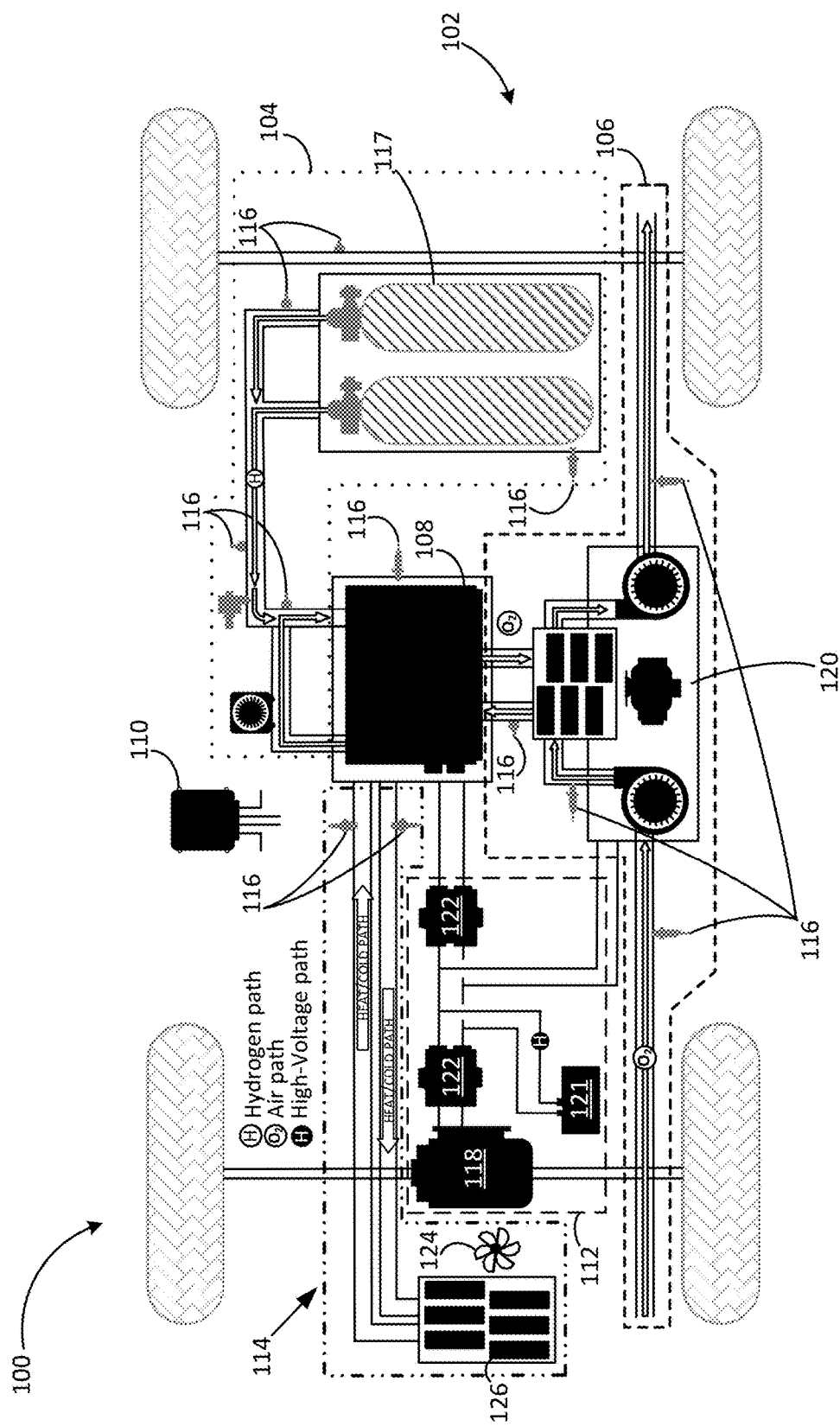
FIG. 1 is a block diagram of a fuel cell system for an electric vehicle, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

SUMMARY

Vehicles, such as automobiles, trucks, SUVs, vans, recreational vehicles, etc., may be equipped with fuel cell systems, which provide electrical power to various components of the vehicles. Some electrical vehicle systems utilize a fuel cell system to power an electric motor for driving the vehicle. Such systems, when operated in higher environmental temperatures, may experience accelerated degradation and reduced fuel cell lifetime. Embodiments presented herein include systems and methods for humidification and cooling of a cathode subsystem of a fuel cell system.

One embodiment provides a cathode subsystem of a fuel cell for an automobile. The system includes a compressor, an air input line including an intercooler configured to cool air output by the compressor, a fluid output line including a fluid injection system, a cathode stack configured to receive air via the air input line and output a fluid to the fluid output line, and an electronic processor configured to control the fluid injection system such that the fluid output from the cathode stack is injected into the air input line.

Another embodiment provides a method of cooling and humidifying air provided via an air input line to a cathode stack of a fuel cell stack of an electric vehicle. The method includes receiving, from a temperature sensor, a temperature measurement at an output of an intercooler, performing a comparison of the temperature measurement to a predetermined threshold, and controlling a fluid injection system configured to receive fluid from a fluid output from the cathode stack such that the fluid is injected into an air input line based on the comparison.

DETAILED DESCRIPTION

Before any embodiments are explained in detail, it is to be understood that the examples presented herein are not limited in their application to the details of construction and the arrangement of components set forth in the following description or illustrated in the drawings. Embodiments may be practiced or carried out in various ways. For example, while the systems and methods are described herein in terms of automotive systems, such systems and methods may be applied to various instances in which electric power is provided to an electric system, such as portable electronic devices.

It should also be noted that a plurality of hardware and software-based devices, as well as a plurality of different structural components may be used to implement the embodiments presented herein. Some embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. Therefore, it should be noted that a plurality of hardware and software-based devices, as well as a plurality of different structural components may be utilized to implement the embodiments presented. For example, "control units" and "controllers" described in the specification can include one or more electronic processors, one or more memory modules including non-transitory computer-readable medium, one or more input/output interfaces, and various connections (for example, a system bus) connecting the components.

For ease of description, some of the example systems presented herein are illustrated with a single exemplar of each of its component parts. Some examples may not describe or illustrate all components of the systems. Other embodiments may include more or fewer of each of the illustrated components, may combine some components, or may include additional or alternative components.

As noted, fuel cell systems may experience accelerated degradation and reduced lifetime and efficiency when operated in higher ambient temperatures (for example, 150-250° C.). While cooling components (for example, coolers and heat exchangers) may be utilized to reduce heat in the system in such environments, such components may be expensive and take up space in the system.

As described in more detail below, fuel cell systems utilize hydrogen and oxygen gas to produce electricity. Water is a waste product of the electrochemical process and is normally output from the system accordingly. However, as explained below, the water output from the fuel cell system may be reused by the system to cool and/or humidify one or more components of the fuel cell system.

FIG. 1 is a block diagram of one example embodiment of a fuel cell system 100. The system 100 is integrated into a vehicle 102. The fuel cell system 100 includes a hydrogen gas ($H_2$) supply (anode) subsystem 104, an oxygen ($O_2$) supply (cathode) system 106, a fuel cell stack 108, an electric control unit 110, an electric motor system 112, and a cooling system 114. The system 100 also includes a plurality of sensors 116 configured to measure various variables of the system (for example, temperature, pressure, humidity, etc.).

The fuel cell system 100 provides electric power to the electric motor system 112 (including a motor 118) of the vehicle 102. A voltage is generated via the fuel cell stack 108. The fuel cell stack 108 includes one or more fuel cells (not shown). The hydrogen gas supply subsystem 104 provides hydrogen gas via a hydrogen gas supply 117 to the anodes (not shown) of the fuel cell stack 108 while the oxygen gas supply subsystem 106 provides oxygen gas (compressed via a compressor 120) to the cathodes (not shown) of the fuel cells. The hydrogen gas is oxidized at the respective anode and split into hydrogen ions and electrons. The hydrogen ions pass through an electrolyte layer between the cathode and anode of the respective fuel cell while the electrons travel along an external circuit to the cathode, producing an electrical current. This electrical current is used to power the electrical motor 118 via the electric motor subsystem 112 as well as other components of the system 100. For example, electrical power may be provided to a battery 121 of the electric motor subsystem 112 and the compressor 120 of the oxygen supply subsystem 106). The electric motor subsystem 112 may include one or more inverters 122 for converting the electrical power provided by the fuel cell stack 108.

At the cathode of the respective fuel cell, the hydrogen ions join with the oxygen gas, producing water as a waste product. The fuel cell stack 108 may be any kind of fuel cell system (for example a proton-exchange membrane fuel cell or PEN FC stack).

Figure 2:
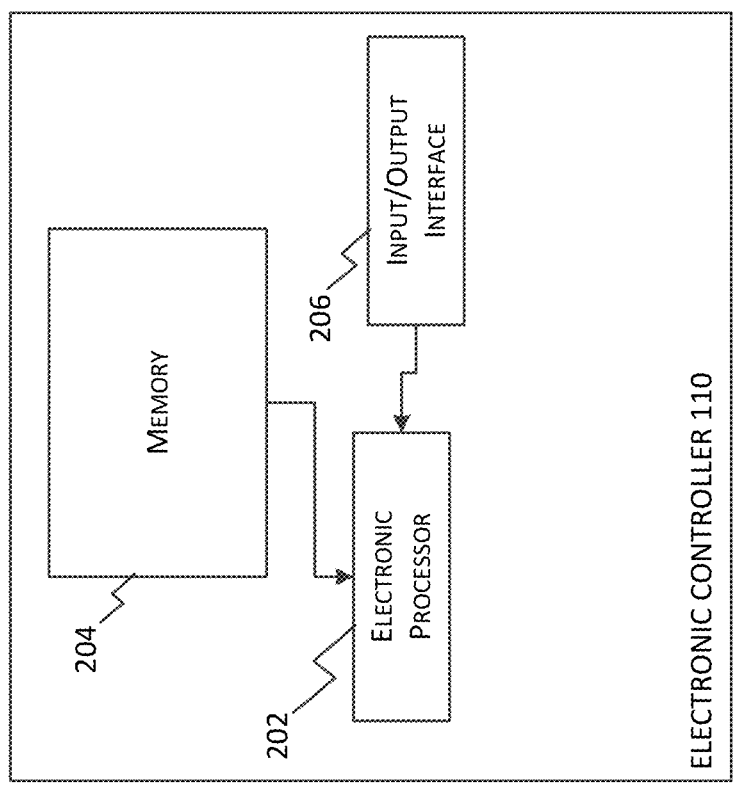
FIG. 2 is a block diagram of an electronic controller of the fuel cell system of FIG. 1, according to some embodiments.
Figure 3:
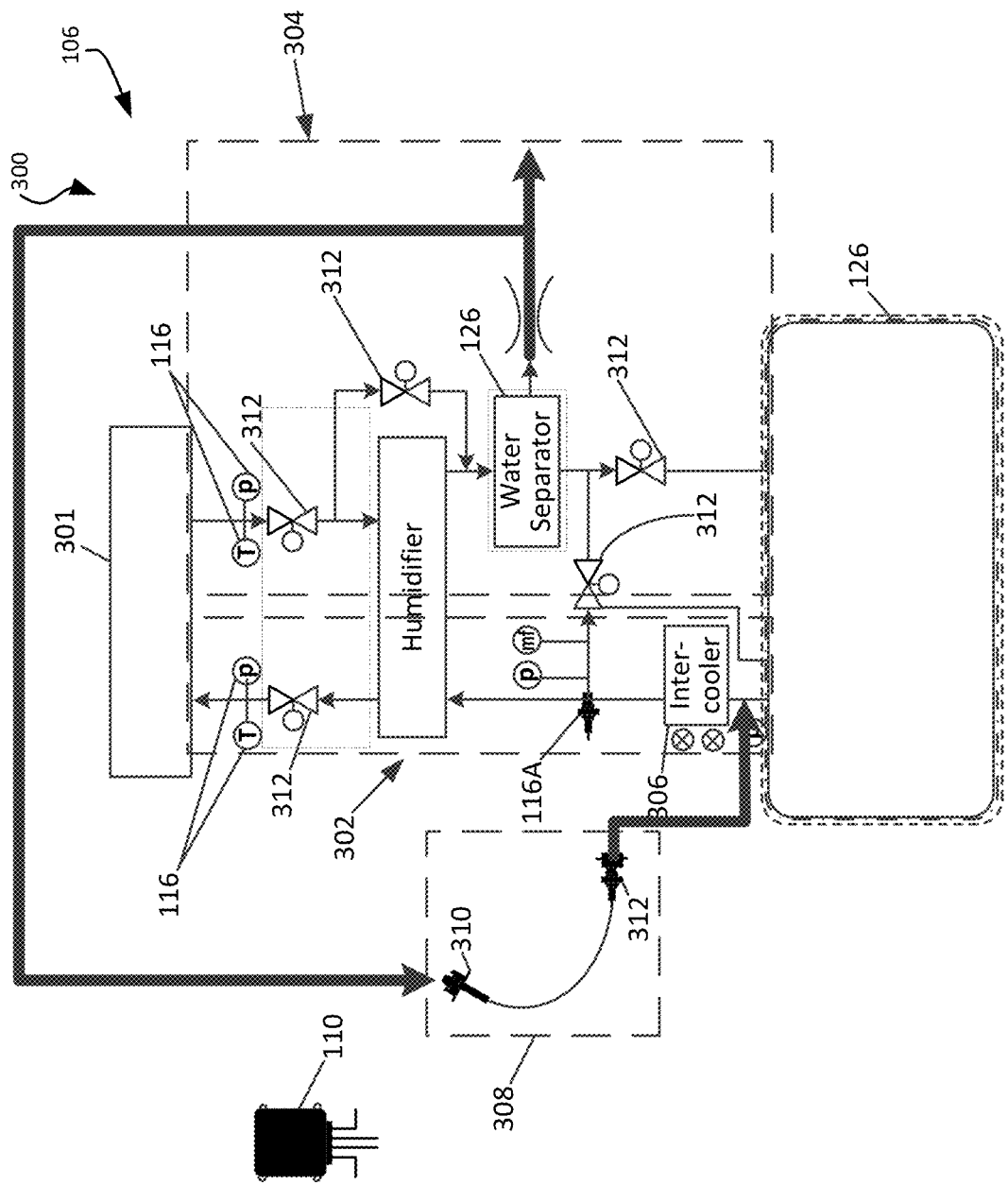
FIG. 3 is a block diagram of a cathode subsystem of the fuel cell system of FIG. 1, according to some embodiments.

The electric control unit 110, which is described in more detail below in regard to FIG. 2, is communicatively coupled to various components of the system 100 (for example, one or more pumps/valves, some of which are shown in FIG. 3 described in more detail below). The electronic control system includes a plurality of electrical components that provide power, operational control, and protection to the components and modules within the fuel cell system 100. For example, as illustrated in FIG. 2, the electronic controller 110 includes an electronic processor 202 (for example, an electronic microprocessor, microcontroller, or other suitable programmable device), a memory 206, and an input/output interface 208. In some embodiments, the electronic controller 110 is implemented partially or entirely in hardware (for example, using a field-programmable gate array ("FPGA"), an application specific integrated circuit ("ASIC"), or other devices. In some embodiments, the electronic processor 202, the memory 204, and the input/output interface 206, as well as the other various modules are connected by one or more control or data buses.

The electronic controller 110, the plurality of sensors 116, and other components of the fuel cell system 100 (as well as other various modules and components of the vehicle 102) are communicatively coupled to each other via wired connections, wireless connections, or some combination thereof. All or parts of the connections used in the system 100 may be implemented using various communication networks, for example, a controller area network (CAN), a wireless local area network (for example, a Bluetooth™ network), and the like. The use of communication networks for the interconnection between and exchange of information among the various modules and components would be apparent to a person skilled in the art in view of the description provided herein.

The electronic processor 202 obtains and provides information (for example, from the memory 204, the plurality of sensors 116 via and the input/output interface 206), and processes the information by executing one or more software instructions or modules stored, for example, in memory 204. The software can include firmware, one or more applications, program data, filters, rules, one or more program modules, and other executable instructions.

The memory 204 can include one or more non-transitory computer-readable media and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. In some embodiments, the electronic processor 202 is connected to the memory 204 and executes software, as described in more detail herein. For example, the electronic processor 202 retrieves from the memory 204 and executes, among other things, instructions related to the control processes and methods described herein.

The input/output interface 206 is configured to receive input and to provide system output. The input/output interface 206 obtains information and signals from, and provides information and signals to (for example, over one or more wired and/or wireless connections) devices and/or components both internal and external to the fuel cell system 100.

In some embodiments, the electronic controller 110 may include additional, fewer, or different components. For example, in some embodiments, the electronic controller 110 may include a transceiver or separate transmitting and receiving components, for example, a transmitter and a receiver. Some or all of the components of electronic controller 106 may be dispersed and/or integrated into other devices/components of the system 100 (for example, a vehicle control module or VCM, not shown, of the vehicle 102).

Returning to FIG. 1, the cooling system 114 is configured to reduce heat generated by various components of the fuel cell system 100 (for example, the fuel cell stack 108). The cooling system 114 may include, for example, one or more heat exchangers/coolers, fans, and the like (for example, a fan 124 and a heat exchanger 126). The cooling system 114 may include additional components for reducing the temperature of one or more of the components of the fuel cell system 100 and/or the vehicle 102.

The oxygen gas supply subsystem 106 includes a compressor 124 configured to compress oxygen gas fed into the subsystem 106 via an input 126. The compressed oxygen gas, as explained in more detail below regarding FIG. 3, is provided to the fuel cell stack 108.

FIG. 3 is a system diagram 300 of the oxygen supply subsystem 106 of the fuel cell system 100. The subsystem 106 includes a cathode stack 301 of the fuel cell stack 108, the compressor 126, an air input line 302, and a fluid output line 304. The air input line 302 includes an intercooler 306 configured to receive air output by the compressor 126. The subsystem 106 also includes a fluid injection system 308. The fluid injection system 308, in the illustrated embodiment, includes a pump 310 and an injection valve 312. In some embodiments, the oxygen supply subsystem 106 also includes a humidifier 314. The oxygen subsystem 106 may also include one or more valves 312. The one or more valves may be communicatively coupled and controlled by the electronic controller 110. The oxygen subsystem 106 may additionally include one or more sensors 116 (for example, pressure and/or temperature sensors) also communicatively coupled to the electronic controller 140. Such sensors 116 may include, for example, a temperature sensor 116A configured to measure a temperature at an output of the intercooler 306.

The humidifier 314 humidifies air of the air input line 302 before the air is provided to the cathode stack 301. In the illustrated embodiment, the humidifier 314 is positioned between the intercooler 306 and the cathode stack 301. In some embodiments, as shown in FIG. 3, the humidifier 314 may also be part of the fluid output line and configured to receive the fluid output of the cathode stack 301 to reuse in the humidification of the air of the air input line 302. Excess waste fluid from the humidifier 314 may be output to a water separator 316. The resulting fluid may be recirculated to the fluid injection system 308.

The fluid injection system 308 is fluidly coupled to the fluid output line 304 and is communicatively coupled to the electronic controller 110. While illustrated as being coupled to an output of the water separator 316 in some embodiments, the fluid injection system 308 may receive fluid output from the cathode stack 301 anywhere along the fluid output line 304. The electronic controller 110 (in particular, the electronic processor 202) is configured to control the fluid injection system 308 (for example, the pump 310 and/or the valve 312) such that the fluid output from the cathode stack 301 is injected into air input line 302. In the illustrated embodiment, the fluid output of the cathode stack 301 is injected into the air inlet line 302 at an input of the intercooler 306. This configuration allows for the air from the compressor 126 to be cooled (and pre-humidified) prior to entering the intercooler 306. In other embodiments, the fluid output from the cathode stack 301 may be injected in alternative places along the air input line 302. For example, in some embodiments, the fluid output of the cathode stack 301 is injected into the air inlet line 302 at an output of the intercooler 306. In other embodiments, the fluid output from the cathode stack 301 may be injected in alternative places along the air input line 302. For example, in some embodiments, the fluid output of the cathode stack 301 is injected into the air inlet line 302 at both an inlet and an output of the intercooler 306. Again, at such an injection point, the air is cooled and pre-humidified via the injection of the fluid. In such embodiments, an additional valve (such as the valve 312) may be utilized in the fluid injection system 308 to inject the fluid in additional locations along the air inlet line 302.

Figure 4:
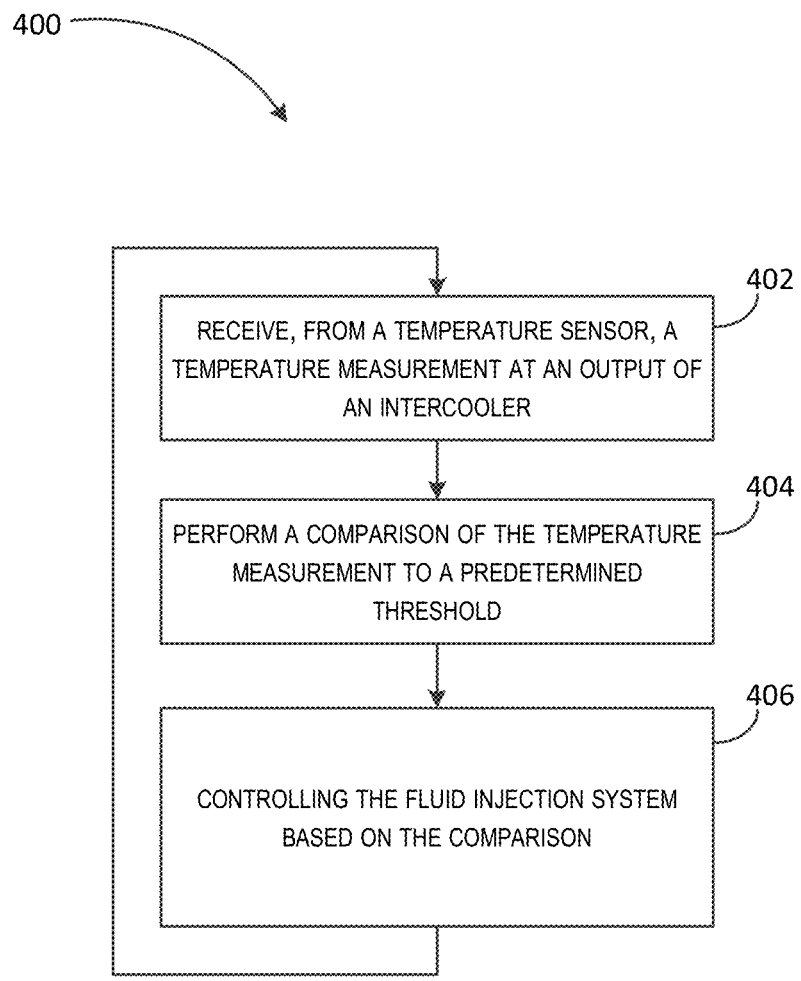
FIG. 4 is a flowchart of a method implemented by an electronic controller of the fuel cell system of FIG. 1, according to some embodiments.

FIG. 4 illustrates an exemplary method 400 of cooling and humidifying air provided to a cathode stack 301 of a fuel cell stack (for example, the fuel cell stack 108). As an example, the method 400 is explained in terms of the electronic controller 110, in particular the electronic processor 202. However, portions of the method 400 may be distributed among multiple devices (for example, one or more additional controllers/processors of or connected to the system 100).

At block 402, the electronic processor 202 receives, from a temperature sensor (for example, the temperature sensor 116A), a temperature measurement at an output of the intercooler 306. At block 404, the electronic processor 202 performs a comparison of the temperature measurement from the temperature sensor 116A to a predetermined threshold. Based on the comparison, the electronic processor 202 controls the fluid injection system 308 such that the fluid is injected into an air input line 302 based on the comparison (block 406). For example, when the temperature measurement exceeds the predetermined threshold, the electronic processor 202 controls the fluid injection system 308 such that fluid from the fluid output line 304 is injected into the air input line 302.

Thus, embodiments provide, among other things, a humidification/cooling system for a cathode subsystem of a fuel cell system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features and advantages of the invention are set forth in the following claims.

What is claimed is:

1. A cathode subsystem of a fuel cell for an automobile, the system comprising:
   a compressor;
   an air input line including an intercooler configured to cool air output by the compressor;
   a fluid output line including a fluid injection system;

a cathode stack configured to receive air via the air input line and output a fluid to the fluid output line;

a temperature sensor; and an electronic processor configured to:

receive, from the temperature sensor, a temperature measurement at an output of the intercooler, perform a comparison of the temperature measurement to a predetermined threshold, and control the fluid injection system such that the fluid output from the cathode stack is injected into the air input line.

2. The cathode subsystem of claim 1, wherein the fluid output from the cathode stack is injected into the air input line at an input of the intercooler.

3. The cathode subsystem of claim 1, wherein the fluid output from the cathode stack is injected into the air input line at an output of the intercooler.

4. The cathode subsystem of claim 1, wherein the fluid output from the cathode stack is injected into the air input line at an output of the intercooler and into the air input line at an input of the intercooler.

5. The cathode subsystem of claim 1, the system further comprising a humidifier configured to humidify air in the air input line.

6. A method of cooling and humidifying air provided via an air input line to a cathode stack of a fuel cell stack of an electric vehicle, the method comprising:

receiving, from a temperature sensor, a temperature measurement at an output of an intercooler;

performing a comparison of the temperature measurement to a predetermined threshold; and controlling a fluid injection system configured to receive fluid from a fluid output from the cathode stack such that the fluid is injected into the air input line based on the comparison.

7. The method of claim 6, wherein the fluid output from the cathode stack is injected into the air input line at an input of the intercooler.

8. The method of claim 6, wherein the fluid output from the cathode stack is injected into the air input line at the output of the intercooler.

9. The method of claim 6, wherein the fluid output from the cathode stack is injected into the air input line at the output of the intercooler and into the air input line at an input of the intercooler.

10. The method of claim 6, wherein the air input line includes a humidifier configured to provide air to the cathode stack.

* * * * *